(No Model.)

W. A. WHITNEY.
WHEELBARROW.

No. 290,156. Patented Dec. 11, 1883.

WITNESSES:
Francis McArdle.
C. Sedgwick

INVENTOR:
W. A. Whitney
BY Munn & Co
ATTORNEYS.

UNITED STATES PATENT OFFICE.

WILLIAM A. WHITNEY, OF HUDSON, MICHIGAN, ASSIGNOR TO HIMSELF AND CATHERINE M. WHITNEY, OF SAME PLACE.

WHEELBARROW.

SPECIFICATION forming part of Letters Patent No. 290,156, dated December 11, 1883.

Application filed September 3, 1883. (No model.)

*To all whom it may concern:*

Be it known that I, WILLIAM A. WHITNEY, of Hudson, in the county of Lenawee and State of Michigan, have invented a new and useful Improvement in Wheelbarrows, of which the following is a full, clear, and exact description.

The object of my invention is to provide certain new and useful improvements in the construction of wheelbarrows, whereby the construction will be materially simplified and the barrow can be erected or taken apart very rapidly or easily.

The invention consists in a wheelbarrow in which the legs and braces are, by a combination of bolts and metal devices, connected rigidly and closely to the handles, whereby the wheelbarrow-frame will be made very strong, and can easily be taken apart and put together again.

Figure 1:
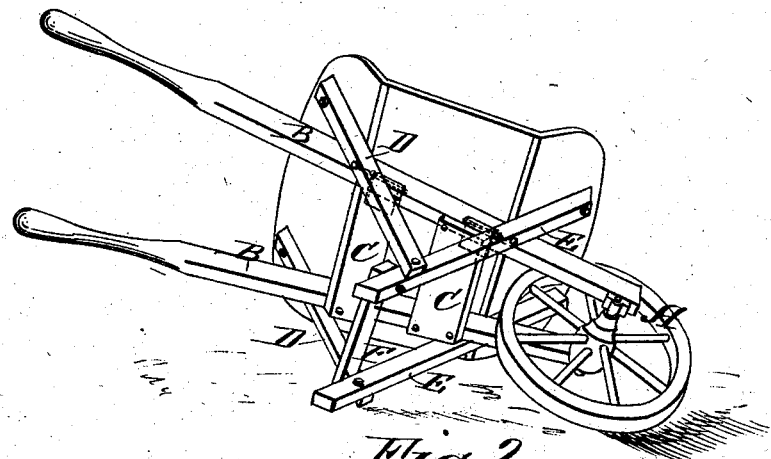
Figure 2:
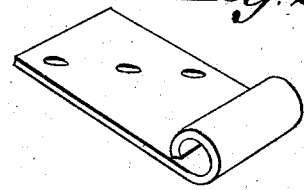

Reference being had to the accompanying drawings, forming part of this specification, Figure 1 is a perspective view of the frame of my improved wheelbarrow, and Fig. 2 a detail, Drawing No. 1, showing the wheelbarrow set up, Drawing No. 2 showing the metal device, which is used in connection with bolts and rivets combined, or with either alone, to bind the frame rigidly and closely together.

The wheel A is mounted on a shaft journaled in the ends of the side bars or handles, B, in the usual manner, which side bars are united by cross-pieces C to form the frame of the barrow. The legs and braces D and E are bolted and connected together by cross-pieces F, in the usual manner, at the bottom; but the said legs and braces D and E, instead of being bolted directly to the handles, are bolted to metal devices—such as are shown in Drawing No. 2—which have been previously attached to the handles B by bolts and rivets combined, or by either alone, and said devices can be placed on the top or the bottom of the handles B.

The device can be made, as per Drawing No. 2, with an eye to receive the bolt, or it can be made with the bolt solid in the device, with the thread and nut on the reverse end.

It will be seen that by the use of these metal devices the braces D and legs E can be always kept closely to the tray or box, thus remedying the imperfection which the shrinkage of the tray or box often causes.

Having thus fully described my invention, what I claim as new, and desire to secure by Letters Patent, is—

The combination, with a barrow-frame having the handles B, of legs and braces D E, bolted to metallic devices previously attached to said handles, as shown and described.

WILLIAM A. WHITNEY.

Witnesses:
L. R. PEIRSON,
C. HATHAWAY.